April 7, 1925.  1,532,128
J. P. FLETCHER
CONVERTIBLE VEHICLE
Filed Nov. 24, 1923   2 Sheets-Sheet 1
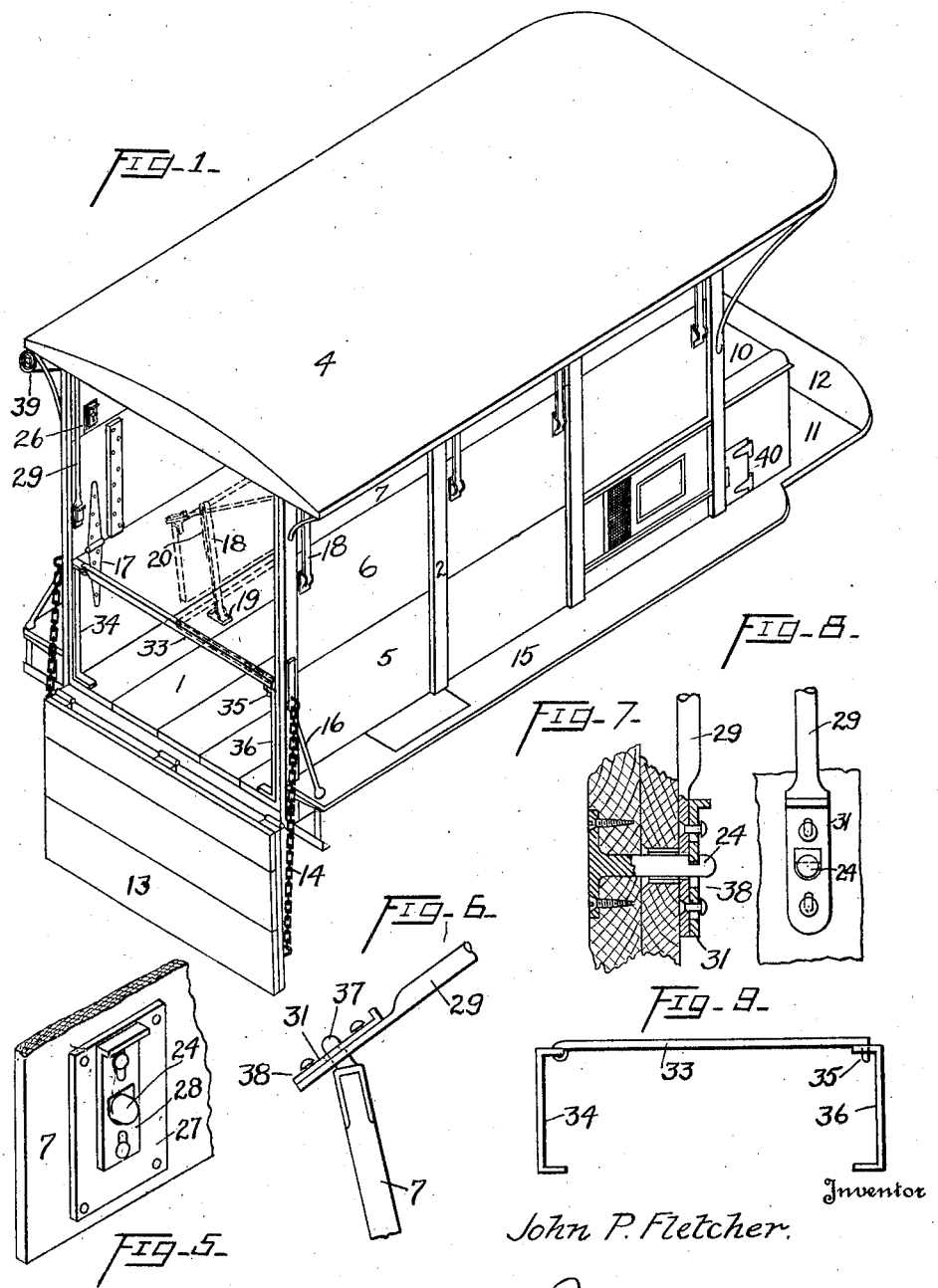
Inventor
John P. Fletcher.
By Jos. I. McMullen
Attorney

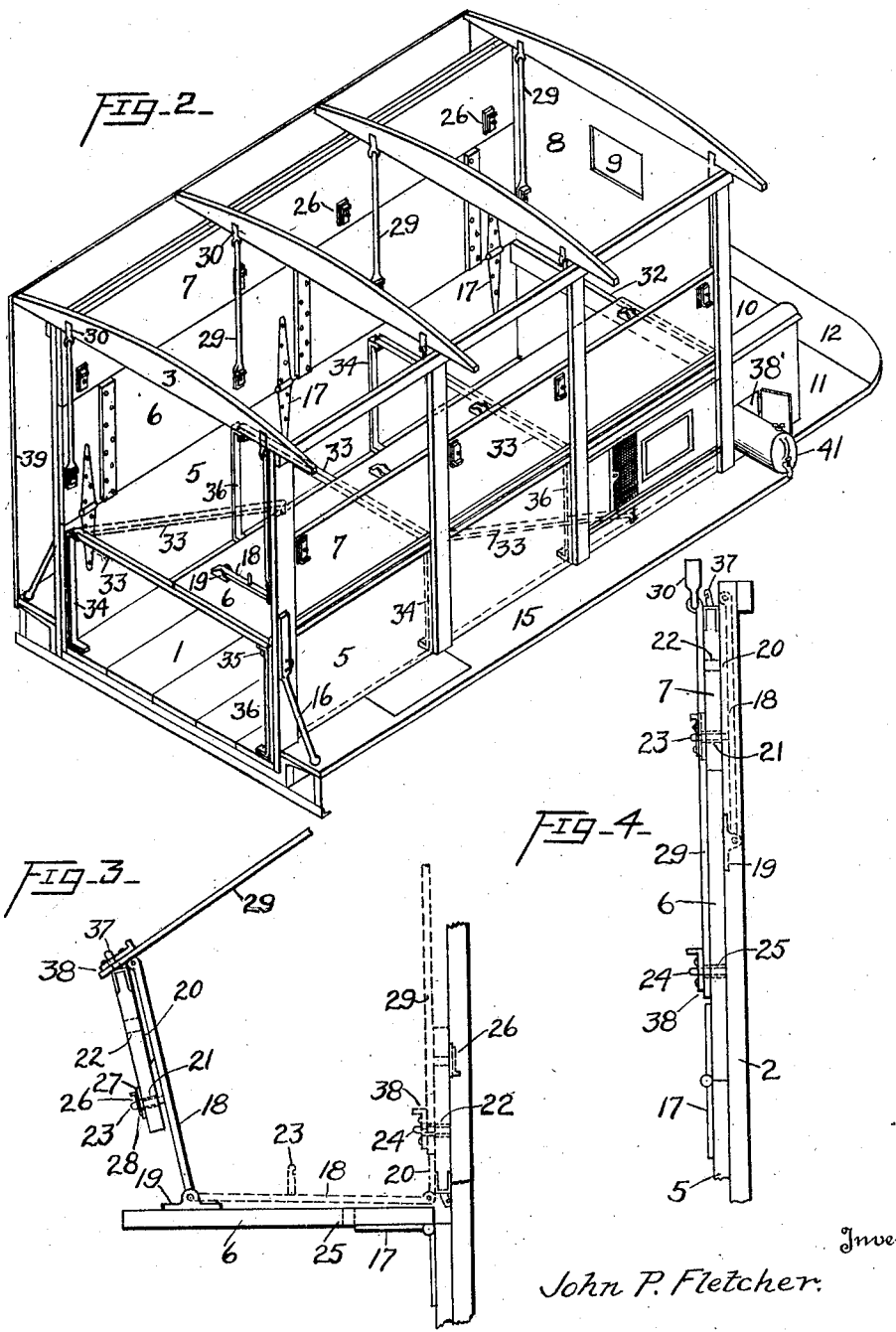

Patented Apr. 7, 1925.

1,532,128

UNITED STATES PATENT OFFICE.

JOHN P. FLETCHER, OF THE UNITED STATES ARMY.

CONVERTIBLE VEHICLE.

Application filed November 24, 1923. Serial No. 676,768.

*To all whom it may concern:*

Be it known that I, JOHN P. FLETCHER, major, Medical Corps, United States Army, and resident of Carlisle, in the county of Cumberland and State of Pennsylvania, have invented a new and useful Improvement in Convertible Vehicles, of which the following description, in conjunction with the accompanying drawings, is a specification.

This invention described herein may be used by the Government, or any of its officers or employees in prosecution of work for the Government, or by any other person in the United States, without payment to me of any royalty thereon.

This invention generically relates to vehicles, more particularly to those of the convertible type, applicable to military service.

The principal object of this invention is to provide a convertible vehicle, capable of being used as a cargo carrier, a passenger vehicle, an auxiliary ambulance, or a combination of these types.

Another object of this invention is to provide a vehicle body mounted on a standard chassis and quickly convertible by adjustment of its side units in a predetermined manner.

Other objects of this invention are to provide a vehicle body having locking means to permanently maintain the side units in their adjusted position; to furnish a convertible vehicle embodying several forms of body construction by virtue of the interchangeability of its sides, and to effect a design in which the running board functions as a mud guard and foot rest.

With these and other objects in view this invention consists in certain novel details of construction, combination and arrangement of parts to be more particularly hereinafter set forth and claimed.

The prevailing designs of military vehicles are such if applicable to ambulance service they are unsuited for other, especially cargo carrying purposes. It is therefore the aim and purpose of this invention to provide a vehicle, which under normal conditions, may be employed to transport Medical Department material and personnel and in an emergency utilized as an auxiliary ambulance.

Briefly stated, this invention comprises a vehicle body having collapsible sides, adjustable to form seats, stretcher decks, or storage space, dependent on the usage to which the vehicle is to be placed.

Referring to the accompanying drawings in which corresponding parts are indicated by similar reference characters:

Fig. 1 is a perspective view of the body showing in dotted outline the side units in seat forming position.

Fig. 2 is a perspective view of the body with top removed, showing one of the side units adjusted to form stretcher deck and side rails.

Fig. 3 is a fragmentary detail in elevation illustrating the units of one side of the vehicle in seat forming position and showing in dotted outline one of the units in the position to form side rails.

Fig. 4 is a fragmentary detail illustrating the units of one side section in normal or side forming position.

Fig. 5 is a sectionized fragmentary perspective showing in detail the locking assembly for fastening the upper side unit to the double acting hinge.

Fig. 6 is a fragmentary detail illustrating locking assembly for fastening the retaining bar to the upper side unit.

Fig. 7 is a sectionized fragmentary detail partly in elevation illustrating the locking assembly between the retaining bar and roof support.

Fig. 8 is a fragmentary detail illustrating in front elevation the assembly shown in Fig. 7, and Fig. 9 is a detail elevation showing the supporting bar and side brackets.

The vehicle forming the subject matter of this application is designed primarily to meet the requirements of the Army Medical Corps, which frequently necessitates a vehicle convertible to carry equipment, personnel or serve as an ambulance.

In the illustrated embodiment characterizing this invention there is shown a body consisting of a floor (1) on which are mounted at spaced intervals uprights (2) fastened at their upper ends to roof beams (3) which latter support a roof covering (4).

At either side of the body are permanent and convertible side units (5), (6) and (7): The forward end of the body is closed by a permanent end wall (8) extending from the floor to the roof and containing a small window (9). In front of this wall is the driver's seat (10) extending the entire width of the body. A continuation of the flooring in front of seat (10) forms the floor board (11) and dash (12).

Rearward of the body is mounted a hinged tail gate (13) which may be supported in any desired position by a chain (14) or other similar element. Extending parallel to the body slightly above the floor level are running boards (15) held in position by suitable braces (16).

Coming now to the important feature of this invention, the side construction, it will be seen the latter involves three units, lower (5), intermediate (6) and upper unit (7). The lower or permanent side unit (5) extends parallel of the vehicle and overlies the lower portion of uprights (2) to which it is affixed.

The intermediate side unit (6) normally rests on the upper edge of unit (5) and the two units at points adjacent their abutting edges, are pivotally connected by equally spaced strap hinges (17). The uppermost unit (7) normally rests on the upper edge of unit (6) and these two units are hingeably connected by a plurality of externally mounted hinge bars (18) hingeably connected at their free ends to intermediate side unit (6) and upper side unit (7) by hinge brackets (19) and straps (20) respectively, as clearly shown in figure 3 of the drawings. Manifestly, with this construction the upper unit (7) may be placed either in the full or dotted line positions shown in Figures 3 and 4.

Upper side units (7) are formed with an upper and lower series of alining transversely extending openings (21) and (22) adapted to receive the notched studs (23) or (24), the former extending from hinge bars (18) and the latter projecting from the uprights (2). Intermediate side units (6) are provided with a series of alining transversely extending openings (25) adapted to receive notched studs (24).

When units (7) are in the position shown in full lines in figure 3, studs (23) project through openings (21) and are engaged by the latch (26).

Although various devices may be utilized to lock the several studs, hereinbefore mentioned, in position, a very satisfactory latching assembly consists of an apertured bed plate (27) and a similarly apertured keeper (28) slidably mounted on the bed plate and adapted to engage the notched end of the stud as it is projected through the openings in the plate and keeper. A series of latches of the type just defined and illustrated in Figure 5, are mounted on the inner surface of unit (7) in operative relation with respect to each of the openings (21) as clearly shown in Figures 2 and 3 of the drawings.

The retaining rods (29) are pivotally connected at their upper extremities to strap eyes (30) which in turn are attached to the roof beams (3), as shown in figure 2. These rods (29) at their lower extremities are flattened and contain a transverse aperture thus forming bed plates which are provided with slidable keepers (31) to engage the notched studs, which project either from the side units or from the uprights (2). The latching assembly on the free ends of retaining rods (29) is identical to the assembly hereinbefore described with the exception of the bed plate which in this case is formed integral with the lower end of the retaining rod.

The intermediate units (6) when in horizontal position are supported by a transversely extending beam (32) and the similarly disposed supporting bars (33). Supporting bars (33) are linked at one end to the upper extremities of vertically disposed brackets (34), suitably mounted in spaced relation along one side, or alternately on either side of the vehicle; the alternate arrangement being shown in the drawings Figure 1. The remaining extremities of the supporting bars (33) are provided with a depending lip (35) which is detachably connected with the upper ends of brackets (36) which are oppositely positioned with respect to brackets (34) as clearly shown in Figure 9 of the drawings. When the free ends of the supporting bars (33) are disengaged from the upper ends of the brackets (36) said bars may be disposed along either side of the vehicle with their free ends resting on the flooring.

The side units (7) are provided at their upper edges with projecting studs (37). The latches (38) of the retaining rods (29) when engaging these studs (37) hold the unit (7) in the upright position shown in solid lines in Figure 3. When unit (7) is in the position shown by dotted lines in Figure 3 transverse openings (22) register with the outwardly projecting studs (24), and the units (7) are locked in this position by means of the latches (38) of the retaining rods (29). When the side wall units (6) and (7) are in the position shown in Figure 4, the transverse openings (25) of the intermediate units (6), register with the studs (24) which project therethrough and are locked in position by the latch (38) of the retaining rods (29) in a similar manner, as shown in Figures 7 and 8.

The vehicle may be equipped with side curtains (39) which when not in use are rolled up and supported by straps, or any suitable means, as shown in Figure 1.

Under the driver's seat is a closed compartment (38') with door (40) containing a tank (41). This tank is provided with a faucet, filler opening and cap. A handle enables the tank to be slid out through the door opening to permit the faucet to clear the running board.

The convertibility of the body to its three principal vehicle types is accomplished by virtue of the interchangeability in the relative positions of its side walls. When the body is to be used as a cargo carrier the side wall units (5) and (6) are held in a superimposed vertical position against the uprights (2) by means of the retaining bars (29) as shown in Figures 1 and 4.

When the body is to be used as a passenger vehicle the upper unit (7) is locked to the hinge bars (18) and held in the upright position shown in Figure 3 by retaining rods (29), which are latched to the studs (37) projecting from the upper edge of the units (7). The upper and intermediate units of either side of the vehicle when held in this position form seats back to back, running the length of the vehicle; when in this position the running boards (15) function as foot rests. To enclose the vehicle when used in this form the side curtains may be drawn as shown in Figure 2.

When the vehicle is to be used as an ambulance the intermediate side members (6) are inclined to a horizontal position resting on the supporting bars (33) and the upper side units are retained against the roof supports (2) by retaining rods (29) as shown in Figures 2 and 3. When the intermediate and upper units (6) and (7) respectively are supported in this position, a vehicle body is formed having an upper deck and side rails. Stretchers may be carried on the lower deck which consists of the floor of the vehicle and also on the upper deck formed by the intermediate side units (6). When the lower deck is in use, ventilation must be provided for the occupants and therefore screened port holes with a slidable closure are provided at the forward ends of the lower side members (5).

When the lower, intermediate and upper side units (5, 6 and 7) respectively, are superimposed upon each other edge to edge as shown in Figure 4, and locked in this position by means of the retaining rods (29), and the supporting bars (33), are laid back against the side walls, the interior of the vehicle is then free from any obstruction and therefore well adapted to be used as a cargo carrier.

In view of the above it is manifest this invention provides an extremely efficient vehicle for military services and one which may be readily converted, when occasion demands, to the various uses hereinbefore outlined.

Although in the foregoing certain elements have been described as best adapted to perform the functions allotted to them, nevertheless it is to be understood that various minor changes may be resorted to within the scope of the appended claims without departing from or sacrificing any of the principles of this invention.

Having described my invention what I claim as new and wish to secure by Letters Patent is:

1. In a vehicle of the class described the combination with a body; of a side closure collapsible intermediate its longitudinal edges to form upper and lower units normally disposed with their adjacent edges in abutting relation, means pivotally interconnecting the upper portions of the respective units to permit adjustment of one unit to a horizontal and the other to a plane inclined with respect to the horizontal and means to effect securement of the respective units in their adjusted position.

2. In a vehicle of the class described the combination with a body; of a side closure collapsible intermediate its edges to form upper and lower units normally positioned with their adjacent edges in abutting relation, means pivotally interconnecting the upper portions of the respective units to permit adjustment of one unit to a horizontal and the other to a plane at an angle to the horizontal, and means to effect securement of the units in their adjusted position.

3. In a vehicle of the class described the combination with a body; of a side closure collapsible intermediate its longitudinal edges to form upper and lower units normally disposed with their adjacent edges in abutting relation, means pivotally interconnecting the upper portions of the respective units to permit adjustment of the lower unit to a horizontal plane, and the upper unit to the position initially occupied by the lower unit and means in connection with the respective units to effect their securement in adjusted position.

4. In a vehicle of the class described the combination with a body; of a side closure collapsible to form upper and lower units normally disposed with their adjacent edges in abutting relation, hinge bars pivotally connected at one extremity to the upper edge of the lower unit and similarly attached at their opposite ends to the upper edge of the upper unit to permit adjustment of the lower unit to a horizontal plane and the upper unit to the position initially occupied by the lower unit and means for retaining the respective units in their adjusted position.

5. In a vehicle of the class described the combination with a body; of a side closure collapsible intermediate its edges to form upper and lower units, normally disposed with their adjacent edges in abutting relation, means pivotally interconnecting the upper portion of the respective units to permit adjustment of the lower unit to a horizontal plane and the upper unit with its longitudinal edge adjacent that of the lower unit and at an angle to the plane of said unit and means in connection with the respective units to secure them in adjusted position.

6. In a vehicle of the character described the combination with a body including a floor, top and side closures collapsible intermediate their longitudinal edges; of means pivotally interconnecting the upper edges of the units of the respective side closures to enable the lower units to be horizontally positioned with their longitudinal edges in adjacent relation and the upper units in the position initially occupied by the lower units, to a stretcher deck with side units disposed at its longitudinal edges and means for securing the units in adjusted position.

7. In a vehicle of the character described the combination with a body including a floor, a top and side closures embodying upper lower and intermediate side units normally positioned with their adjacent edges in abutting relation; of means pivotally interconnecting the upper edge of the upper and intermediate units of each side closure to enable adjustment of the intermediate units to a horizontal position with adjacent edges in meeting relation and the upper units in the position initially occupied by the intermediate units to form a stretcher deck with the intermediate units of the side closures disposed along the longitudnal edges of the deck and means to secure the respective units in their adjusted position.

JOHN P. FLETCHER.